United States Patent
Zhang et al.

(10) Patent No.: US 7,094,467 B2
(45) Date of Patent: Aug. 22, 2006

(54) ANTISTATIC POLYMER MONOFILAMENT, METHOD FOR MAKING AN ANTISTATIC POLYMER MONOFILAMENT FOR THE PRODUCTION OF SPIRAL FABRICS AND SPIRAL FABRICS FORMED WITH SUCH MONOFILAMENTS

(76) Inventors: Heping Zhang, 1005 Shinnecock Hills Ct., Summerville, SC (US) 29483; William Harwood, 1654 Lahaina Ct., Gulf Breeze, FL (US) 32563; Gilbert Ross, 2972 Birchwood Dr., Waycross, GA (US) 31503

( * ) Notice: Subject to any disclaimer, the term of this patent is extended or adjusted under 35 U.S.C. 154(b) by 27 days.

(21) Appl. No.: 10/894,737

(22) Filed: Jul. 20, 2004

(65) Prior Publication Data
US 2006/0019093 A1    Jan. 26, 2006

(51) Int. Cl.
*D01F 6/00* (2006.01)

(52) U.S. Cl. .................. 428/372; 428/364; 428/395

(58) Field of Classification Search ................ 428/372, 428/364, 395
See application file for complete search history.

(56) References Cited

U.S. PATENT DOCUMENTS

| | | | |
|---|---|---|---|
| 5,935,706 A | | 8/1999 | Hoover et al. |
| 6,083,562 A | | 7/2000 | Rodriguez et al. |
| 6,426,134 B1 | * | 7/2002 | Lavin et al. .............. 428/300.1 |
| 6,528,572 B1 | * | 3/2003 | Patel et al. .................. 524/495 |
| 6,852,410 B1 | * | 2/2005 | Veedu et al. ................. 428/367 |

FOREIGN PATENT DOCUMENTS

| | | |
|---|---|---|
| EP | 0 308 234 A1 | 3/1989 |
| EP | 0 327 227 A2 | 8/1989 |
| EP | 0 399 397 A2 | 11/1990 |
| EP | 0 294 504 B1 | 2/1992 |
| EP | 1 054 036 A1 | 11/2000 |
| GB | 2 101 559 A | 1/1983 |
| WO | WO 02/076724 A1 | 10/2002 |

* cited by examiner

*Primary Examiner*—N. Edwards
(74) *Attorney, Agent, or Firm*—Caesar, Rivise, Bernstein, Cohen & Pokotilow, Ltd.

(57) ABSTRACT

An antistatic polymer monofilament of this invention comprises a polymer composite of a thermoplastic polymer as a matrix and carbon nanotubes as a conductive filler.

A process of this invention for manufacturing an antistatic polymer monofilament comprising the steps of blending in an extruder a thermoplastic polymer and carbon nanotubes and extruding monofilaments from said blend.

An industrial fabric of this invention, which is usable in nonwoven and papermaking machines, said fabric comprising monofilaments for dissipating static charges, said monofilaments including a thermoplastic polymer matrix and a filler of carbon nanotubes.

7 Claims, No Drawings

ANTISTATIC POLYMER MONOFILAMENT, METHOD FOR MAKING AN ANTISTATIC POLYMER MONOFILAMENT FOR THE PRODUCTION OF SPIRAL FABRICS AND SPIRAL FABRICS FORMED WITH SUCH MONOFILAMENTS

BACKGROUND OF THE INVENTION

1. Field of the Invention

This invention relates to an antistatic polymer monofilament, a method for making an antistatic polymer monofilament for the production of spiral fabrics and spiral fabrics employing such monofilaments.

2. Description of Related Art

Industrial fabrics used as non-woven lay down conveyer belts in machines for making non-woven fabrics and paper machine clothing employed at the final dryer sections of paper making machines require antistatic properties. That is, they must dissipate or prevent the build up electrical charges to prevent such charges from accumulating to a point where high energy sparking may occur when the belts or clothing contact grounded objects. Such high energy sparking can create an undesired safety hazard. Permanent antistatic monofilaments are frequently included in industrial fabrics to prevent the undesired build up of static charges.

Current antistatic fabrics are very similar to conventional polyester dryer fabrics with the exception that they contain carbon filled polyamide antistatic yarns and conductive edging. The seams are either loop seams or endless. There is a disadvantage to both seam styles. The loop seam is weaker than the main body of the fabric and also can put an undesired seam mark onto the finished product. An endless seamed fabric is very time consuming to install, which also is undesirable.

British Patent GB 21 01 559 discloses a fabric that has metal wires woven together with polymer monofilaments, where the metal wires are capable of discharging electrostatic charges from the fabric. The disadvantage of this structure is that the stretching behavior of the metal wire differs significantly from that of the remaining fabric. This can easily lead to breakage of the metal wires. An additional risk is that the metal wires normally corrode in air, which creates points of interruption for discharging the static charges.

To overcome the above-identified problems of utilizing metal wires in conjunction with polymer monofilaments in the fabric, fabrics have been made with surface coated monofilaments, with the surface coating including conductive particles to dissipate undesired static charges. Thus, the conductive coating on the polymeric monofilaments renders the monofilaments antistatic without losing the benefit of monofilament mechanical properties. Examples of such coating treatments are disclosed in EP 0327227A2 (1989) to Xerox, EP 0308234 A 1(1989) to Courtaulds, EP 0294504 B 1(1987) to BASF, and U.S. Pat. No. 5,935,706 (1999) to Dupont. In the prior art coating processes a polymer monofilament typically is first treated to make it receptive for receiving the conductive coating. Thereafter, the conductive coating, e.g., carbon black or a layer of metal particles, are then suffused onto the treated surface of the polymer monofilament. Though this approach maintains most of the polymer monofilament properties, the antistatic sheath or coating tends to wear away, due to the fact that the coated monofilaments frequently are subject to strong mechanical abrasion. In particular, during the fabric weaving process, friction between the coated monofilaments and mechanical parts of the weaving machine tend to abrade the coated sheath and cause serious housekeeping problems. Moreover, the monofilament treatment and coating process involves complicated chemical processing, thereby undesirably increasing the cost of the formed fabric.

Another prior art practice has been to incorporate antistatic particles into polymer bodies instead of employing a surface coating. A variety of materials, including carbon fibers, metallic fibers and carbon blacks can be used as polymer additives for making antistatic or conductive polymer compositions. Such approaches are disclosed in, e.g., U.S. Pat. No. 6,083,562 (2000) to Sterling Chemicals International and EP 0399397 A2 (1990) to Dupont. The desired electrical conductivity in the polymer composite is achieved when an adequate network of conductive particles or fibers is established within the polymer. Large amounts of carbon black or metal particles, typically in an amount >10 wt %, need to be incorporated into the polymer to form the desired network for dissipating static charges.

The above-described polymer composites including conductive additives have not been reported for use in polymer monofilaments. This is largely due to the fact that the composite does not have good compatibility between the polymer matrix and the highly loaded, large particle-sized antistatic fillers. In particular, carbon black, carbon fibrils and metal particles, typically in a dimension of microns, lead to severe phase separation during formation (i.e., extrusion and orientation in the solid state) of monofilaments, resulting in very brittle filaments having unacceptable variations in diameter along their length. Such monofilaments would be unsuitable for use in applications of this invention, which require the monofilaments to have a high degree of structural integrity to maintain their mechanical properties and close dimensional tolerances along their length.

Graphite nanotubes as a conductive medium are a relatively new entry in this general area. Compared to carbon blacks, which typically have a particle size on the order of several microns, the multiple wall nanotubes have a diameter between 10–20 nm and an aspect ratio of greater than 100, making them sub-micron in size. The surface area of these nanotubes typically can be about 250 $m^2/g$ and can establish a conductive network in a polymer matrix at very low loadings, resulting in minimal degradation of polymer physical properties. EP 1054036 A1 (2000) to Fina Research S.A. discloses partially oriented fibers made of polyethylene and polypropylene with carbon nanotubes. WO 02/076724 (2002) to Eikos disclosed electrically conductive polymer films containing carbon nanotubes. These disclosures, however, are not readily applicable to, nor do they suggest forming monofilaments.

Polymer monofilaments, which are the subject of the instant invention, differ from fibers and films of the type disclosed in EP 1054036 and WO 02/076724 in that the primary purpose of the carbon nanotubes in the present invention is to provide a network capable of dissipating a static charge, and that the diameter of a round cross sectional area of the formed monofilament is greater than 0.05 mm. Any fillers in the polymer matrix can easily cause phase separation in the monofilament orientation process as the monofilament exits the extruder.

It is an object of this invention to develop polymer monofilaments that exhibit permanent static dissipative properties with long lasting effect and good mechanical properties.

All references cited herein are incorporated herein by reference in their entireties.

SUMMARY OF THE INVENTION

A monofilament in accordance with this invention includes a thermoplastic polymer matrix and a filler of carbon nanotubes as a conductive medium for dissipating static charges.

The monofilaments of this invention preferably have a diameter between 0.1 mm to 1.0 mm; (b) a surface resistivity between $10^4$ to $10^9$ ohms/square; (c) a static dissipation rate less than 200 µs; (d) a tensile tenacity greater than 1.5 g/d; and (e) a tensile elongation at break greater than 20%.

A monofilament in accordance with this invention is formed by blending in an extruder a thermoplastic polymer and carbon nanotubes and extruding monofilaments from said blend. A wide variety of thermoplastic polymers may be employed in this invention, such as polyesters, polyamides, polyethylene, polypropylene and polyphenylene sulfide (PPS). The preferred polymers are polyesters and polyamides, with the most preferred polymer being polyethylene terephthalate (PET), such as PET "Crystar" Merge 5147 sold by Dupont in Wilmington Del., USA. Preferred nanotubes are "Fibril" nanotubes supplied as product MB6815-00, which is a 15% masterbatch of the nanotubes in PET, sold by Hyperion Catalysis International Inc., 38 Smith Place, Cambridge, Mass. 02138.

An industrial fabric usable in nonwoven and papermaking machines also constitutes a part of this invention. The fabric comprises monofilaments for dissipating static charges, said monofilaments including a thermoplastic polymer matrix and a filler of carbon nanotubes.

In a preferred embodiment of a fabric in accordance with this invention the monofilaments for dissipating static charges are woven with filaments of other thermoplastic polymers. Most preferably the other filaments are monofilaments of polyethylene terephthalate (PET).

Preferably the fabric is of a spiral construction including monofilaments of this invention as stuffer elements, said fabric including conductive edging.

DETAILED DESCRIPTION OF THE INVENTION

A monofilament in accordance with this invention includes a thermoplastic polymer matrix and a filler of carbon nanotubes as a conductive filler for dissipating static charges. These nanotubes are known in the art. They have a diameter of between 10–20 nm and an aspect ratio of greater than 100. Typically the surface area of the nanotubes is 250 m 2/g and can establish a conductive network in a polymer matrix at very low loadings, resulting in minimal degradation of polymer physical properties. The nanotubes disclosed in EP 1054036 A1 (2000) and WO 02/076724 (2002), are usable in this invention. These latter-two publications already have been incorporated by reference herein.

Preferably the thermoplastic polymer employed as the matrix of the monofilaments of this invention is a polyester, but as noted earlier, the use of other thermoplastic polymers is contemplated to be within the scope of the broadest aspects of this invention. Also, as noted earlier the preferred polymers are polyesters and polyamides, with the most preferred polymer being polyethylene terephthalate (PET), such as PET "Crystar" Merge 5147 sold by Dupont.

Also, as noted earlier the preferred nanotubes are "Fibril" nanotubes supplied as product MB6815-00, which is a 15% masterbatch of the nanotubes in PET, sold by Hyperion Catalysis International Inc.

In accordance with the broadest aspect of this invention the carbon nanotubes are present in a weight percent of less than 15%, based on the weight of the monofilament. More preferably the carbon nanotubes are present in a weight percent of less than 10% and even more preferably in a weight percent of less than 5%.

The monofilaments of this invention preferably have a diameter between 0.1 mm to 1.0 mm; (b) a surface resistivity between $10^4$ to $10^9$ ohms/square; (c) a static dissipation rate less than 200 µs; (d) a tensile tenacity greater than 1.5 g/d; and (e) a tensile elongation at break greater than 20%. The monofilament in accordance with this invention is formed by blending in an extruder a thermoplastic polymer and carbon nanotubes and extruding monofilaments from said blend.

An industrial fabric usable in nonwoven and papermaking machines, said fabric comprising monofilaments for dissipating static charges, said monofilaments including a thermoplastic polymer matrix and a filler of carbon nanotubes.

In a preferred embodiment of a fabric in accordance with this invention the monofilaments for dissipating static charges are woven with filaments of other thermoplastic polymers. Most preferably the other filaments are monofilaments of polyethylene terephthalate (PET) and the monofilaments for dissipating static charges are woven into the fabric as stuffer filaments.

Preferably the fabric is of a spiral construction including monofilaments of this invention as stuffer elements, said fabric includes an edge sealing polymer incorporating sufficient carbon black to provide anti-static properties, thereby forming a network of static dissipating material within the fabric.

Industrial fabrics including the antistatic polymer monofilaments of the present invention can be quickly and easily installed onto a non-woven machine. Moreover, these fabrics will have a very smooth surface and a non-marking seam. Furthermore, the antistatic material does not shed during its manufacture or in its end use in the industrial fabrics of this invention.

As the monofilaments of the present invention are impregnated with the static dissipating material, and not coated, the fabrics derived from said monofilaments have smooth surfaces that will not generate dust during manufacturing and in use, and also are easy to seam. It is unnecessary to cantilever the machine as with an endless seam. As an added benefit, if the fabric is damaged it is possible to remove or replace the damaged section.

The inventive, antistatic monofilament is handled in the same manner as any conventional monofilament. It does not cause a dusting problem of the type that occurs with carbon black coated monofilament. Moreover the monofilament of the present invention is cheaper to make than the market-available products.

The following table shows the properties of monofilaments within the scope of this invention. However, this is just illustrative of the invention and is not intended as a limitation on the broadest aspects of the invention.

The formulation of the monofilaments is as follows:

Du Pont Crystar Merge 5147 PET—68%

Hyperion MB6815-00—26%

Compatabilizer —3% FUSE 100 supplied by Polymer Dynamix, 665 Martin St, Rahway, N.J. 07065.

| Sample # | Draw Ratios | Total Draw | Tenacity (g/den) | Elongation @ Break (%) | Young's Mod. (g/den) | Shrinkage (%) | Surface Resistance (Ω/sq) | Denier (g/9000 m) |
|---|---|---|---|---|---|---|---|---|
| Extruder | | | | | | | | |
| 1 | 3 | 3 | 1.4 | 42 | 57 | 13.6 | $1 \times 10^9$ | 3085 |
| 2 | 3.5 | 3.5 | 1.75 | 35 | 70 | 15.5 | $1 \times 10^{12}$ | 2605 |
| 3 | 4 | 4 | 2.2 | 10 | 85 | 17.1 | $2 \times 10^{12}$ | 2168 |
| 4 | 3 × 1 | 3 | 1.55 | 42 | 58 | 11.4 | $1 \times 10^{12}$ | 2954 |
| 5 | 3 × 1.05 | 3.15 | 1.7 | 32 | 67 | 13.5 | $2 \times 10^{11}$ | 2721 |
| 6 | 3 × 1.1 | 3.3 | 1.65 | 25 | 65 | 13.8 | $1 \times 10^{11}$ | 2757 |
| 7 | 3 × 1.2 | 3.6 | 1.95 | 10 | 77 | 15.6 | $6 \times 10^{11}$ | 2424 |
| 8 | 3 × 1.05 × 1 | 3.15 | 1.75 | 23 | 65 | 10.1 | $6 \times 10^8$ | 2776 |
| 9 | 3 × 1.05 × .9 | 2.84 | 1.5 | 26 | 53 | 6.9 | $3 \times 10^9$ | 2908 |
| 10 | 3 × 1.05 × .85 | 2.68 | 1.4 | 42 | 43 | 2.7 | $1 \times 10^8$ | 3215 |
| 11 | 3 × 1.1 × .875 | 2.89 | 1.7 | 27 | 53 | 4.7 | $2 \times 10^{11}$ | 2738 |
| 12 | 3 × 1.05 × .95 | 2.99 | 1.6 | 30 | 57 | 7.0 | $4 \times 10^8$ | 2730 |
| 13 | 3 × 1 × .95 | 2.85 | 1.62 | 35 | 62 | 6.8 | $2 \times 10^7$ | 2786 |

The draw ratios represent the degree of stretching of the filament during processing. For example, in sample 12 3×1.05×0.95 denotes that the yarn was stretched by 3× in the first drawing step then by 1.05× in the second stage, and finally relaxed by 0.95× in the final stage. This is achieved by changing the godet roll speeds, so that in this case if the $1^{st}$ roll speed is 30 feet/min, then the second would be 30×3=90 feet/min (i.e., a 3× stretch), the third would be 90×1.05=94.5 feet/min (i.e., 1.05× stretch) and the last would be 94.5×0.95=89.8 feet/min (i.e., 95×).

Mechanical properties tested according to ASTM D2256-97. Thermal shrinkage test carried out according to ASTM D204 with the temperature modified to 204° C. Surface resistance measured using a Trek 152 meter with a 2P probe according to ASTM D4496.

While the invention has been described in detail and with reference to specific examples thereof, it will be apparent to one skilled in the art that various changes and modifications can be made therein without departing from the spirit and scope thereof.

What is claimed is:

1. An antistatic polymer monofilament comprising a polymer composite of (a) a thermoplastic polymer as a matrix and (b) carbon nanotubes as a conductive filler, said monofilament having a diameter between 0.1 mm to 1.0 mm, a surface resistivity between $10^4$ to $10^9$ ohms/square, a static dissipation rate less than 200 μs, a tensile tenacity greater than 1.5 g/d and a tensile elongation at break greater than 20%.

2. The monofilament of claim 1, wherein said thermoplastic polymer is selected from the group consisting of a polyester, polyamides, polyethylene, polypropylene and polyphenylene sulfide.

3. The monofilament of claim 1, wherein the thermoplastic polymer is a polyester.

4. The monofilament of claim 1, wherein the polyester is polyethylene terephthalate.

5. The monofilament of claim 1, wherein the carbon nanotubes are present in a weight percent of less than 15% of the monofilament.

6. The monofilament of claim 1, wherein the carbon nanotubes are present in a weigh percent of less than 10% of the monofilament.

7. The monofilament of claim 1, wherein the carbon nanotubes are present in a weight percent of less than 5% of the monofilament.

* * * * *